United States Patent [19]

Kraus et al.

[11] 4,074,945

[45] Feb. 21, 1978

[54] CABLE FASTENER ASSEMBLY

[75] Inventors: James R. Kraus, Hagerstown, Md.; Howard C. Murphy, Williamsport, Pa.

[73] Assignee: Pennsylvania Wire Rope Corporation, Williamsport, Pa.

[21] Appl. No.: 683,789

[22] Filed: May 6, 1976

[51] Int. Cl.$^2$ .................................................. F16B 9/00
[52] U.S. Cl. .................................. 403/197; 285/162; 16/2; 74/501 R; 403/238
[58] Field of Search .............. 403/238, 239, 197, 288, 403/3; 339/128, 103 B; 74/501 R; 285/162, 194, 205; 248/56; 16/2, 108; 174/65 R, 65 G

[56] References Cited

U.S. PATENT DOCUMENTS

| | | | |
|---|---|---|---|
| 1,738,037 | 12/1929 | Collins | 16/2 X |
| 1,830,250 | 11/1931 | Tiefenbacher | 285/194 X |
| 3,101,205 | 8/1963 | Benham | 403/197 X |
| 3,221,572 | 12/1965 | Swick | 74/501 |
| 3,366,405 | 1/1968 | Sevrence | 74/501 |
| 3,369,071 | 2/1968 | Tuisky | 174/65 R |
| 3,528,313 | 9/1970 | Berno | 74/501 |

*Primary Examiner*—Andrew V. Kundrat
*Attorney, Agent, or Firm*—Brady, O'Boyle & Gates

[57] ABSTRACT

A cable fastener assembly including a latch clip connected to a collar, the collar being positioned on one side of a wall and the latch clip positioned on the opposite side of the wall, the latch clip having finger portions abutting the wall, and constructed and arranged so that the fastener assembly can be mounted in walls of different thicknesses, seal means disposed between the collar and the wall, and between one end of the latch clip and a cable extending through the fastener assembly.

5 Claims, 5 Drawing Figures

CABLE FASTENER ASSEMBLY

BACKGROUND OF THE INVENTION

The cable fastener assembly of the present invention is an improvement of the cable fastener assemblies disclosed in U.S. Pat. Nos. 3,221,572 to Swick dated Dec. 7, 1965; 3,366,405 to Sevrence dated Jan. 30, 1968; and 3,528,313 to Berno dated Sept. 15, 1970, in that the latching fingers or prongs in the fastener assembly of the present invention are constructed and arranged in such a manner that the fastener assembly is adapted for mounting in walls of various thicknesses which could not be accomplished heretofore. Furthermore, the collar and tab end of the latch clip of the present invention have seals integrally connected thereto, whereby a seal is provided between the collar and the wall and between the tab end of the latch clip and the cable.

DESCRIPTION OF THE PREFERRED EMBODIMENT

Figure 1:
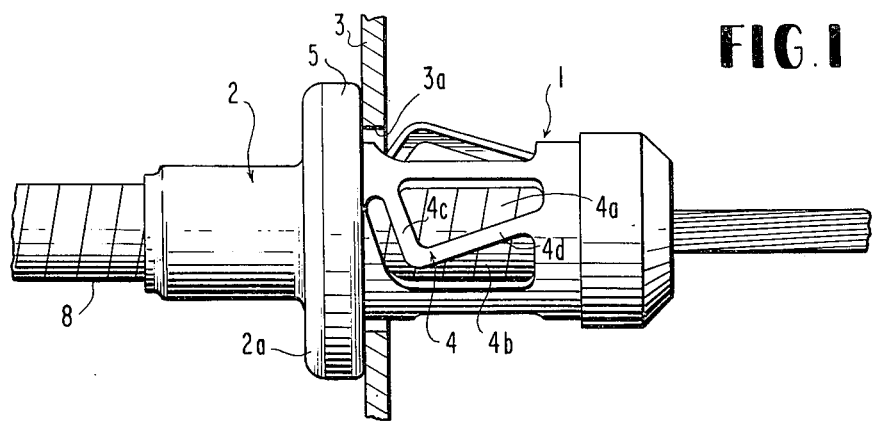
FIG. 1 is a side elevational view of the cable fastener assembly of the present invention mounted in operative position.
Figure 2:
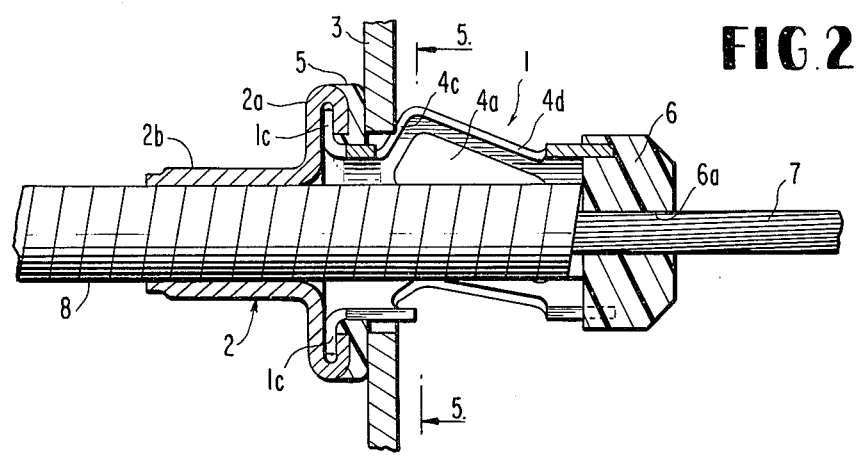
FIG. 2 is a sectional, side elevational view of the fastener assembly as shown in FIG. 1.

Referring to the drawings, and more particularly to FIGS. 1 and 2 thereof, the cable fastener assembly of the present invention comprises, essentially, a latch clip 1 connected to a collar 2, the collar being positioned on one side of a wall 3 and the latch clip being positioned on the opposite side of the wall. The latch clip is formed with finger portions 4 constructed and arranged to not only adapt the fastener assembly for mounting through walls of different thicknesses, but also to prevent rotation of the fastener assembly within the aperture 3a in the wall through which it is mounted. A suitable sealant 5 is applied to the collar and abuts one face of the wall 3, and a sealant 6 is also applied to the end of the latch clip.

Figure 3:
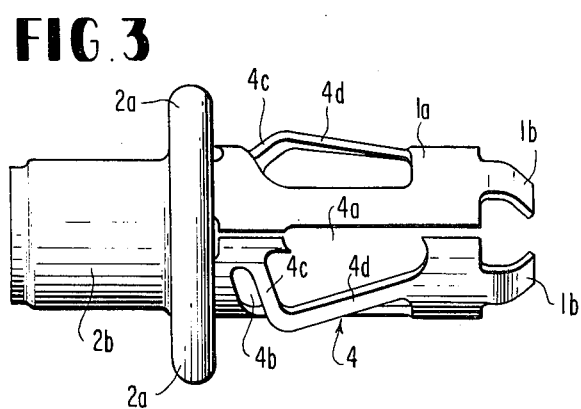
FIG. 3 is a side elevational view of the fastener assembly of the present invention without the seals on the collar and the tab end of the latch clip.
Figure 4:
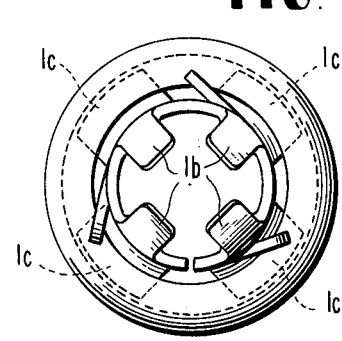
FIG. 4 is an end elevational view of the fastener assembly as shown in FIG. 3.
Figure 5:
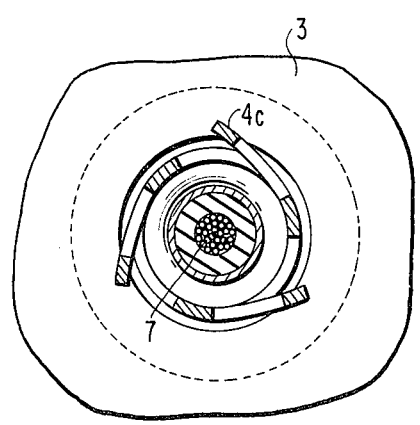
FIG. 5 is a view taken along line 5—5 of FIG. 2.

The details of the construction of the fastener assembly are readily shown in FIGS. 2, 3 and 4, wherein it will be seen that the latch clip 1 comprises a body portion 1a, having inwardly bent tab members 1b at one end thereof through which the cable 7 extends, and outwardly bent tabs 1c on the opposite end around which a flange portion 2a on the collar is bent, whereby the collar is fixedly secured to the latch clip. The collar 2 is also formed with a sleeve portion 2b which engages the outer surface of a conventional sheath 8 through which the cable 7 extends.

As will be seen in FIG. 2, the seal 5 is bonded to one face of the collar flange 2a and abuts the wall 3, and the seal 6 is bonded to the tab members 1b and is provided with a bore 6a through which the cable 7 extends. By providing seals between the fastener assembly and the wall through which it extends, and between the fastener and the cable, the dirt and water-tight integrity of the wall is maintained.

The latch clip 1 of the fastener assembly is preferably formed of sturdy hardened steel which was originally in blank sheet form, the sheet being passed through suitable cutting dies to not only form the tabs 1b and 1c but also to form the finger portions 4 which are formed by stamping the sheet to form cut-out portions 4a, 4b to thereby provide portions 4c and 4d. When the stamped sheet is bent to form the cylindrical configuration of the latch clip, the resiliency of the steel causes the portions 4c and 4d of the fingers to extend outwardly of the generatrix of the cylindrical surface of the body portion, whereby the finger portions 4c and 4d extend tangentially and at an angle thereto.

The inclination and tangential disposition of portions 4c of the latch clip fingers is an important feature of the present invention, since it not only facilitates the mounting of the fastener assembly in walls of different thicknesses but also prevents rotation of the fastener assembly within the wall aperture in which it is mounted. The inclination and tangential disposition of portions 4d of the fingers facilitates the mounting of the fastener within the wall in that when mounting the fastener in the wall, the tab end 1b of the fastener is inserted through the wall aperture and the peripheral edge of the wall aperture 3a progressively engages the inclined edge 4d of the fingers causing the fingers to be cammed radially inwardly, circumferentially around the cylindrical surface of the body portion of the latch clip until the inclined portions 4c of the fingers pass through the aperture, whereupon the resiliency of the clip causes the fingers to spring outwardly as shown in the drawings. Thus, it will be readily seen in FIG. 2 that the inclination of portions 4c of the fingers adapts the latch clip for mounting in walls of different thicknesses and the tangential dispostion of the finger portions prevents the fastener assembly from turning while mounted in the wall aperture.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A cable fastener for mounting a sheathed cable extending through an aperture in a wall comprising, a latch clip adapted to be positioned on one side of said wall, a collar adapted to be positioned on the opposite side of the wall, one end of said latch clip being connected to said collar, said latch clip having a substantially cylindrical body portion and resilient finger means integrally connected thereto, said resilient finger means each having diverging portions extending tangentially to the latch clip body portion and inclined toward opposite end planes of said cylindrical body so that when inserting the fastener in a wall aperture the peripheral edge of the wall aperture progressively engages certain inclined portions of the resilient finger means causing the finger means to be cammed radially inwardly circumferentially around the cylindrical body portion until other inclined portions of the resilient finger means pass through said aperture whereupon the resilient finger means spring radially outwardly causing said other inclined portions of the resilient finger means to engage the peripheral edge of the wall aperture to secure the fastener within said aperture, whereby the fastener assembly is adapted for mounting in walls of various thicknesses and is prevented from rotating within the wall aperture.

2. A cable fastener according to claim 1, wherein inwardly bent tab members are provided on the opposite end of said latch clip.

3. A cable fastener according to claim 1, wherein said one end of the latch clip is provided with outwardly bent tabs, said collar having a flange portion bent inwardly around said tabs, whereby the latch clip is connected to said collar.

4. A cable fastener according to claim 2, wherein a seal is integrally connected to said tab members.

5. A cable fastener according to claim 3, wherein a seal is integrally connected to one face of said flange portion and abuts one face of the wall.

* * * * *